(12) United States Patent
Cocchi et al.

(10) Patent No.: US 11,163,357 B2
(45) Date of Patent: Nov. 2, 2021

(54) SUPPORT SYSTEM AND CORRESPONDING METHOD FOR THE MANAGEMENT OF A MACHINE FOR TREATING FOOD PRODUCTS

(71) Applicant: ALI GROUP S.R.L.—CARPIGIANI, Cernusco sul Naviglio (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernusco sul Naviglio (IT)

( * ) Notice: Subject to any disclaimer, the term of this patent is extended or adjusted under 35 U.S.C. 154(b) by 0 days.

(21) Appl. No.: 16/986,112

(22) Filed: Aug. 5, 2020

(65) Prior Publication Data
US 2021/0064123 A1    Mar. 4, 2021

(30) Foreign Application Priority Data
Sep. 3, 2019    (IT) .................... 102019000015485

(51) Int. Cl.
*G06F 3/01* (2006.01)
*G02B 27/01* (2006.01)
(Continued)

(52) U.S. Cl.
CPC .......... *G06F 3/011* (2013.01); *G02B 27/0101* (2013.01); *G02B 27/0172* (2013.01);
(Continued)

(58) Field of Classification Search
None
See application file for complete search history.

(56) References Cited

U.S. PATENT DOCUMENTS

| 9,791,936 B1 * | 10/2017 | Kovach ..................... G09G 5/12 |
| 10,732,721 B1 * | 8/2020 | Clements ................ G06F 3/167 |

(Continued)

FOREIGN PATENT DOCUMENTS

| JP | 2016189043 A | 11/2016 |
| KR | 20150085853 A | 7/2015 |

OTHER PUBLICATIONS

Italian Search Report dated Apr. 8, 2020 for counterpart Italian Patent Application No. 102019000015485.

*Primary Examiner* — Jason A Pringle-Parker
(74) *Attorney, Agent, or Firm* — Shuttleworth & Ingersoll, PLC; Timothy Klima

(57) ABSTRACT

A support system for management of a machine for treating food products includes an augmented reality visor including: a camera for capturing a first image; a display for displaying a second image; and a first module for transmitting the first image and receiving the second image. Included is a machine for treating food products, including a treatment chamber for receiving a food product, an actuator for applying a treatment process on the food product inside the treatment chamber, and a second module connectable to the first module. A processing and control unit is connected to the second module for receiving the first image from the visor through the second module, identifying a plurality of real elements within the first image, generating the second image, incorporating a graphic element into the second image, and transmitting the second image to the visor through the second module.

22 Claims, 4 Drawing Sheets

(51) Int. Cl.
*G05B 19/4069* (2006.01)
*G06F 3/0481* (2013.01)
*G06F 3/0482* (2013.01)

(52) U.S. Cl.
CPC ....... *G05B 19/4069* (2013.01); *G06F 3/0482* (2013.01); *G06F 3/04815* (2013.01); *G02B 2027/0138* (2013.01); *G05B 2219/32014* (2013.01)

(56) References Cited

U.S. PATENT DOCUMENTS

| | | | |
|---|---|---|---|
| 2003/0020707 A1* | 1/2003 | Kangas | G06F 3/011 345/418 |
| 2014/0043433 A1* | 2/2014 | Scavezze | G02B 27/0172 348/42 |
| 2015/0288622 A1* | 10/2015 | Fargano | H04L 41/5054 370/401 |
| 2015/0347850 A1* | 12/2015 | Berelejis | H04L 67/22 345/633 |
| 2016/0176724 A1 | 6/2016 | Ji et al. | |
| 2018/0204385 A1* | 7/2018 | Sarangdhar | G08C 17/02 |
| 2018/0357821 A1* | 12/2018 | Tezel | G03B 21/005 |
| 2019/0060602 A1 | 2/2019 | Tran et al. | |
| 2019/0066239 A1* | 2/2019 | Touchette | G06Q 20/3276 |
| 2019/0075965 A1* | 3/2019 | Strang | A47J 44/00 |
| 2020/0088463 A1* | 3/2020 | Jeong | G06F 3/167 |

\* cited by examiner

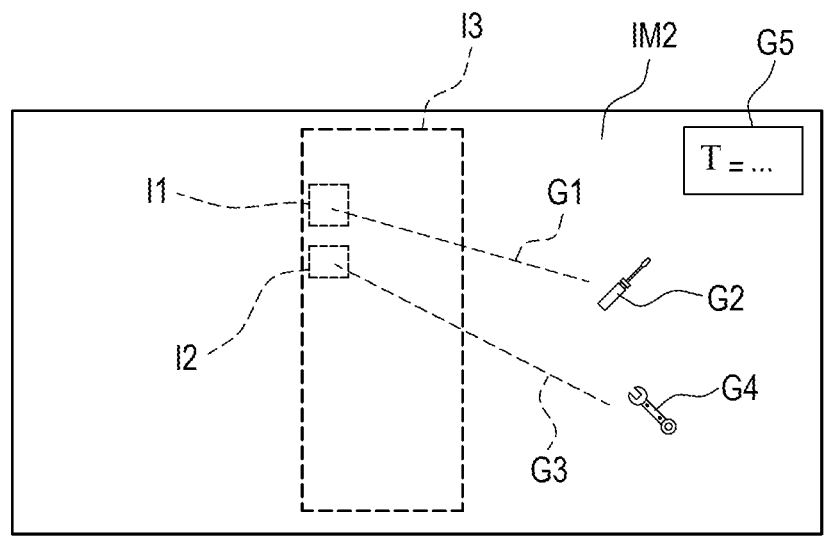
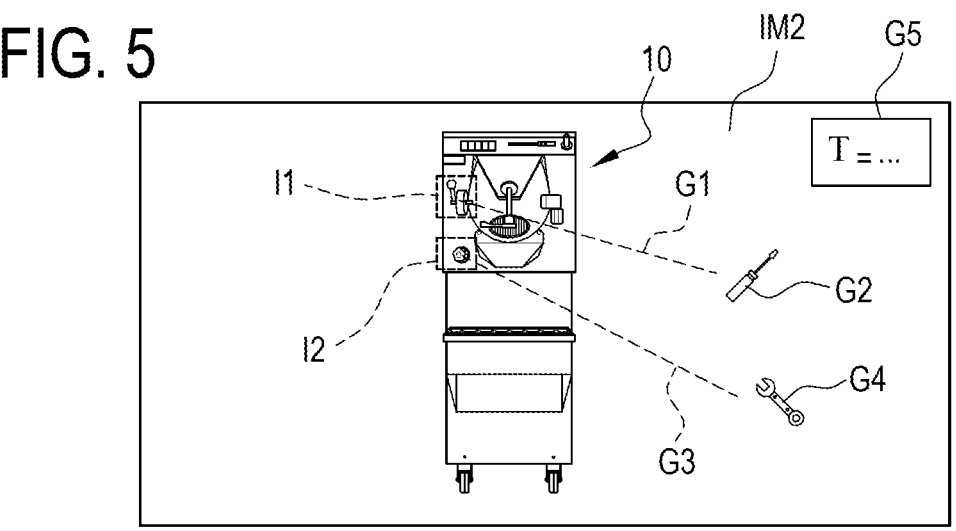
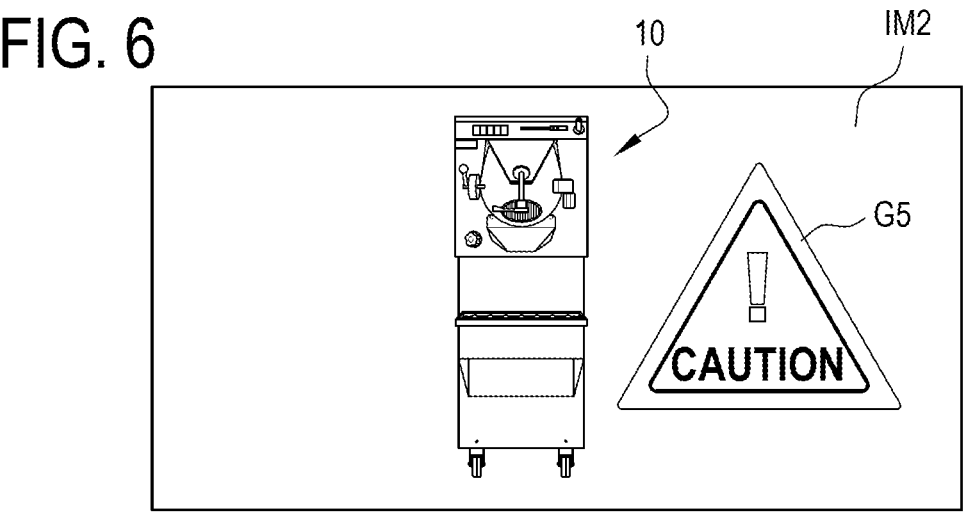

SUPPORT SYSTEM AND CORRESPONDING METHOD FOR THE MANAGEMENT OF A MACHINE FOR TREATING FOOD PRODUCTS

This application claims priority to Italian Patent Application 102019000015485 filed Sep. 3, 2019, the entirety of which is incorporated by reference herein.

BACKGROUND OF THE INVENTION

This invention relates to a support system and corresponding method for the management of a machine for treating food products: for example, a machine for treating liquid or semi-liquid food products.

Prior art machines for treating food products do not have any system for providing assembly engineers/installers/end users with immediate support for the different operations that these operators are called upon to perform on the machines in the course of their daily work in the trade (e.g. machine setup, machine maintenance, production with the aid of recipes, machine cleaning, etc.).

Moreover, even where some form of support is contemplated, it is usually provided through remote support means (for example, telephone) with the disadvantage of possible misunderstandings between remote support personnel and operating personnel working on the machine.

The trade therefore feels the need to reduce the time connected with installation, maintenance and/or running of the production machines.

Furthermore, it is desirable for such installation and maintenance to be free of human error.

Thus, a need felt by technical staff (installation and assembly engineers) working on a machine for treating food products is that of reducing machine installation time and errors.

Another need, in this case felt by the (end) user of the machine, is that of reducing the time and errors involved in the washing/cleaning and maintenance of the machine.

Another need felt by the user of the machine is that of receiving comprehensive and effective support for the carrying out of recipes and for the management of the work programs executable by the machine: by way of non-limiting example, batch freezing and/or cooking/baking programs.

Generally speaking, it should also be stressed that, in the trade concerned, there is a general need to reduce the time and cost of professional training for technical staff (assembly and maintenance engineers) and/or for end users of the machine in respect of the specific activities that they are called upon to perform on the machine.

SUMMARY OF THE INVENTION

This invention therefore has for an aim to meet the above mentioned needs by providing a support system for the management of a machine for treating food products (of any kind) according to this disclosure.

BRIEF DESCRIPTION OF THE DRAWINGS

The technical features of the invention, with reference to the above aims, are clearly described in the annexed claims and its advantages are more apparent from the detailed description which follows, with reference to the accompanying drawings which illustrate an example, non-limiting embodiment of the invention and in which:

FIGS. 3 to 8 illustrate aspects and features of one or more embodiments.

DESCRIPTION OF THE PREFERRED EMBODIMENTS

With reference to the accompanying drawings, the numeral 10 denotes a machine of this invention, for treating food products.

By "treating", as used in this disclosure, is meant any action—for example, thermal, mechanical, chemical, cleaning or of any other kind—carried out on the food product for the purposes of processing. For example, treating may comprise cleaning a surface that comes into contact with the food product and the machine 10 may comprise a dishwasher.

The machine 10 may be any machine for the production of food products.

Hereinafter, however, for simplicity and ease of understanding and without losing in generality, the machine 10 will be described as a machine designed to treat liquid or semi-liquid products (thermally)—suitable, for example, to perform a thermal treatment such as pasteurization, or for making an ice cream product.

Figure 1:
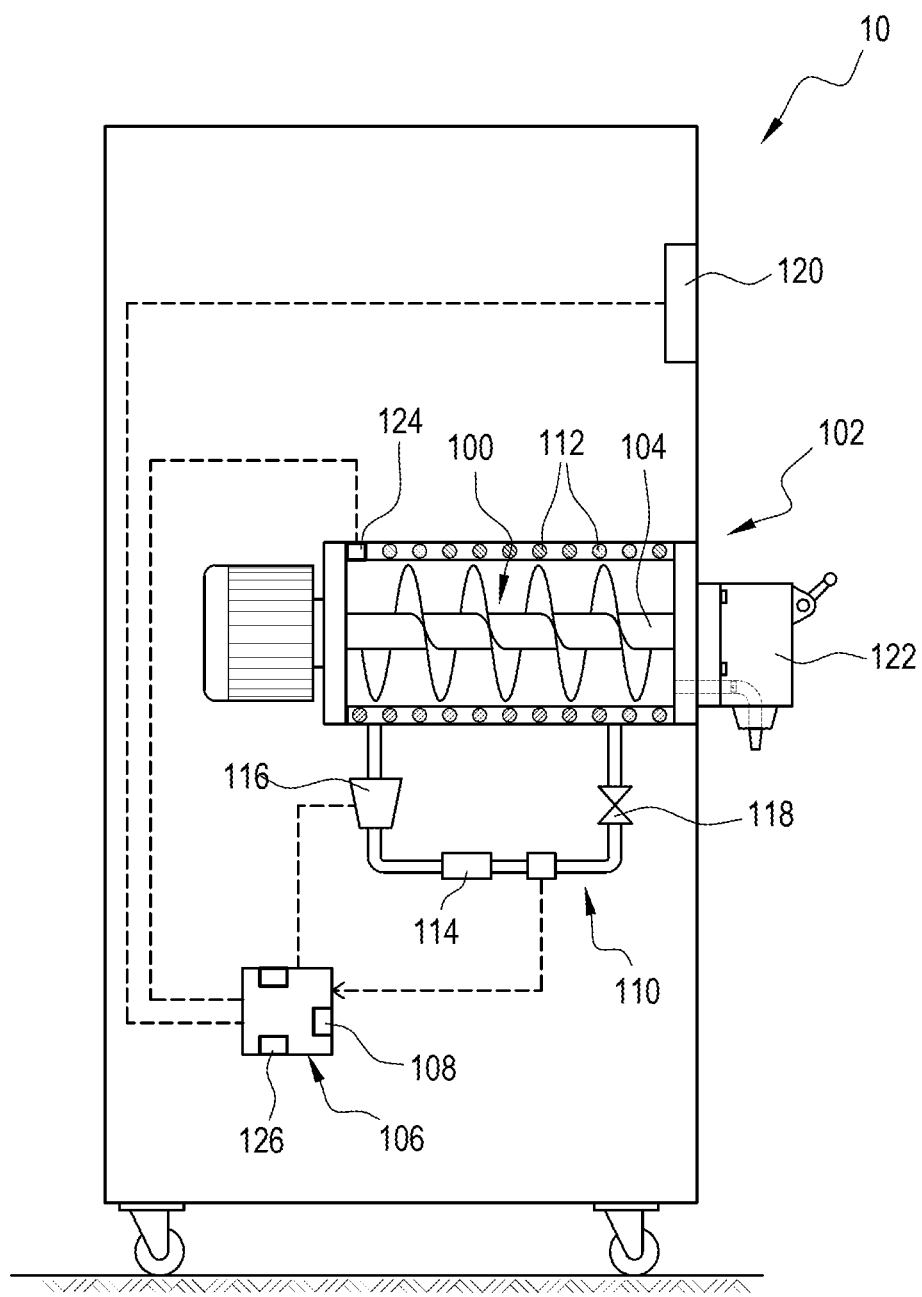
FIG. 1 is a schematic view of a machine according to one or more embodiments of this invention.

The machine 10 for treating liquid or semi-liquid food products illustrated in FIG. 1 is preferably a machine for making products of the sector of ice cream, bakery and confectionery and the like (by way of non-limiting example: gelato, soft serve ice cream, granitas, milk shakes, yogurt, frozen desserts, chilled creams) and may thus comprise a machine for making ice cream (soft serve or artisan gelato) provided with a container for thermal treatment (pasteurization).

The machine 10 for treating food products such as, for example, liquid or semi-liquid products, comprises:

a treatment chamber 100, configured to receive a food product; as illustrated in FIG. 1 (the machine 10 may preferably comprise a container 102 for processing a liquid or semi-liquid base product and defining the treatment chamber 100), at least one actuator 104 configured to apply a treatment process on the food product inside the treatment chamber 100; as illustrated in FIG. 1, the actuator 104 may preferably comprise a stirrer (preferably mounted inside the container 102) to mix the product inside the treatment chamber 100;

a processing and control unit 106; and a data exchange module 108, preferably a wireless transceiver, connected (for example, included or coupled) in the processing and control unit 106.

By "actuator", as used in this disclosure, is meant any mechanical, electrical, electronic or other element operating on the food product to perform a process on it (of any kind: mechanical, thermal, or chemical, for example).

According to an aspect, the actuator 104 may be defined by one or more heating and/or cooling elements.

More generally speaking, the machine 10 may be a machine for treating food products of any kind: for example, it may be an oven, a refrigerator, a kneading machine, a machine for the ice cream/bakery and confectionery trade or other machine.

If the machine 10 for treating food products is an oven, the machine 10 may comprise one or more of the following elements:

one or more heating elements configured to thermally treat the food product (and, in this disclosure, also referred to as "actuators" operating on the product), one or more controls for adjusting the product processing temperature, one or more controls to allow adjusting one or more thermal cycles on the product, one or more controls for adjusting the speed and on/off time cycle of fans, one or more controls to control and adjust the humidity inside the oven.

According to an aspect of the invention, the processing and control unit 106 is configured to drive the actuator 104 (or the actuators if the machine 10 comprises a plurality of actuators 104), for example by switching it on and off and/or by modifying its operating state.

The machine 10 for treating food products, as illustrated in FIG. 1, may also comprise a thermal treatment system 110, comprising a heat exchanger 112 associated with the processing container 102.

As illustrated in the non-limiting example of FIG. 1, the machine 10 may comprise a motor connected to the stirrer 104 to drive the stirrer in rotation. Preferably, the motor is connected to the processing and control unit 106.

According to another aspect, the thermal system 110 comprises a heat exchanger 112 associated with the processing container 102, a further heat exchanger 114, a compressor 116 and a pressure reducing element 118. It should be noticed that the heat exchanger 112, the further heat exchanger 114, the compressor 116, and the pressure reducing element 118 define a circuit containing a heat exchanger fluid.

In other words, the thermal system 110 is a thermodynamic system (configured to operate according to a thermodynamic cycle using a heat exchanger fluid).

According to another aspect, the machine 10 comprises a user interface 120 comprising at least one user-operable control (preferably a plurality of controls) and connected to the processing and control unit 106. Preferably, the interface 120 comprises user-operable activation and selection controls and/or pushbuttons.

According to yet another aspect, the machine 10 comprises a dispenser 122, which is connected to the processing container 100 for processing a liquid or semi-liquid base product, and which allows the product to be extracted from the container 100. The dispenser 122 preferably comprises a user-operable lever to allow dispensing the treated product.

Figure 2:
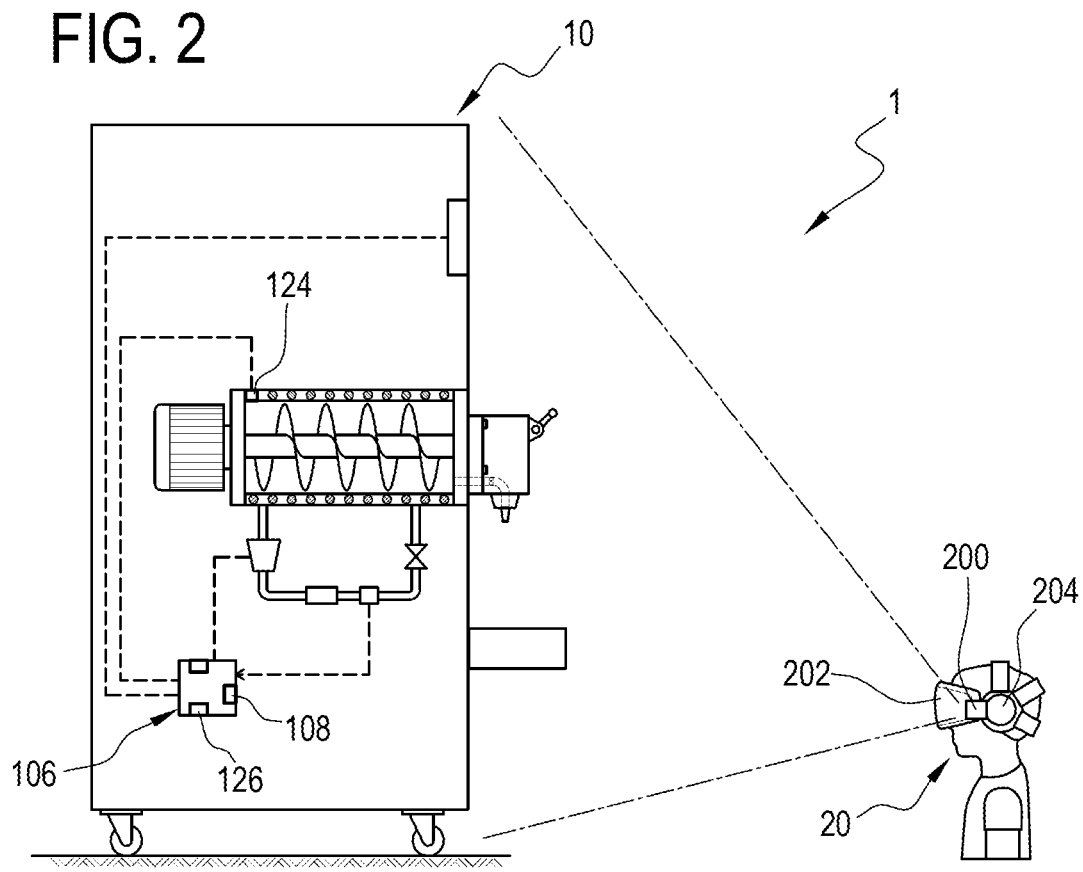
FIG. 2 is a schematic view of a system according to one or more embodiments.

FIG. 2 shows a non-limiting example of a support system 1 for the management of a machine 10 for treating food products according to this invention. As illustrated in FIG. 2, the system comprises a machine 10—for example of the type described above, comprising the treatment chamber 100, the actuator 104 and the data exchange module 108.

The support system 1 also comprises an augmented reality visor device 20: that is to say, a device through which users can enhance their sensory experiences through multimedia information (electronically manipulated and conveyed) which is overlaid on what is perceived by their eyes.

The visor device 20 comprises:

at least one camera 200 configured to capture at least one first image IM1;

at least one display 202 configured to display at least one second image IM2; and a data exchange module 204, connectable (and similar) to the data exchange module 108 of the machine 10, configured to transmit the first image IM1 and receive the second image IM2.

In one or more embodiments, the camera 200 may comprise a picture camera: for example, the picture camera of a smartphone.

In one or more embodiments, the visor device 20 may comprise a device to be worn on a user's head or head-mounted display (HMD)—for example, augmented reality goggles—and/or portable devices or handheld displays—for example, tablets, PCs or smartphones—and/or spatial devices or displays—for example, video projectors, holograms, radio frequency tags. Hereinafter, for simplicity and ease of understanding, reference will be made to a head-mounted visor 20, but without losing in generality.

The processing and control unit 106 is connected to (for example, coupled to or comprising) the data exchange module 108.

As will become clear as this description continues, when the data exchange modules 108, 204 are connected, the processing and control unit 106 is configured for:

receiving from the visor device 20 the first image IM1 captured by the data exchange module 108, identifying a plurality of real elements O1, O2, O3 in the first image IM1, where the real elements O1, O2, O3 may indicate parts or components of the machine 10, optionally associating one or more augmented reality elements G1-G4 with one or more real elements O1-O3 of the plurality of real elements O1-O3.

The expression "augmented reality element" is used to mean any graphical element (including text) and/or sound element generated on the basis of information present in, or derivable from, the first image IM1 (for example, based on one or more real elements O1-O3 identified in the first image IM1).

Optionally, the processing and control unit 106 is configured for:

generating a second image IM2, incorporating one or more augmented reality graphic elements G1-G5 into the second image IM2, and transmitting the second image IM2 (containing the augmented reality elements) to the visor device 20 through the data exchange module 204 of the visor device 20.

Optionally, the visor device 20 may comprise sound-reproducing means and the processing and control unit 106 is optionally configured for associating one or more augmented reality sound elements with one or more real elements O1-O3 of the plurality of real elements O1-O3.

Thus, the visor device can provide the operator (a setup or maintenance engineer, an end user of the machine, etc.) with graphic indications and/or sound indications to support the different activities to be performed on the machine (e.g., setup, maintenance, preparing products and making recipes, cleaning, etc.).

The augmented reality elements G1-G5 may be of different kinds: for example, they may comprise text elements, geometric elements, graphic connecting elements (e.g. arrows) and/or a static and/or dynamic virtual reconstruction of the real object identified in the one or more first regions.

According to an aspect of the invention, the processing and control unit 106 may simultaneously serve the function of processing and control unit of the machine 10 and the function of a computer for managing the augmented reality visor device 20. The processing and control unit 106 may comprise the control card of the machine 10. Thus, the machine 10 may comprise and manage augmented reality contents.

In one or more embodiments, the machine 10 for treating food products may comprise a memory 126, connected to (for example, coupled to or inserted in) the processing and control unit 106 and containing a plurality of augmented reality elements G1-G5 relating to the operation and/or installation and/or maintenance of the machine for treating food products.

In one or more embodiments, the memory 126 may comprise a plurality of geometrical/dimensional/colour information items of components of the machine 10, and/or objects (such as an upper limb of a user) which the processing unit 106 is configured to identify. Thus, the step of identifying a plurality of real elements O1, O2, O3 in the first image IM1 may comprise comparing the first image IM1 captured with the information stored in the memory 126 in a manner known to those skilled in the art.

In one or more embodiments, the memory 126 may comprise a plurality of images that depict components of the machine 10, and/or objects (such as an upper limb of a user) which the processing unit 106 is configured to identify. Thus, the step of identifying a plurality of real elements O1, O2, O3 in the first image IM1 may comprise comparing the first image IM1 captured with the images stored in the memory 126 in a manner known to those skilled in the art.

In one or more embodiments, the memory 126 may comprise information relating to the life cycle and/or the event history of the machine 10 and the processing and control unit 106 may be configured to manage the life cycle and/or the event history.

According to an aspect of the invention, the camera 200 may be positioned on the visor device 20 so as to capture the first image IM1 which covers the user's field of view. In other words, the user's field of view is at least partly overlaid on the at least one camera 200, as shown in FIG. 2, where the dashed lines show what the user's eyes see and what is captured by the camera 200 in the image plane.

Figure 3:
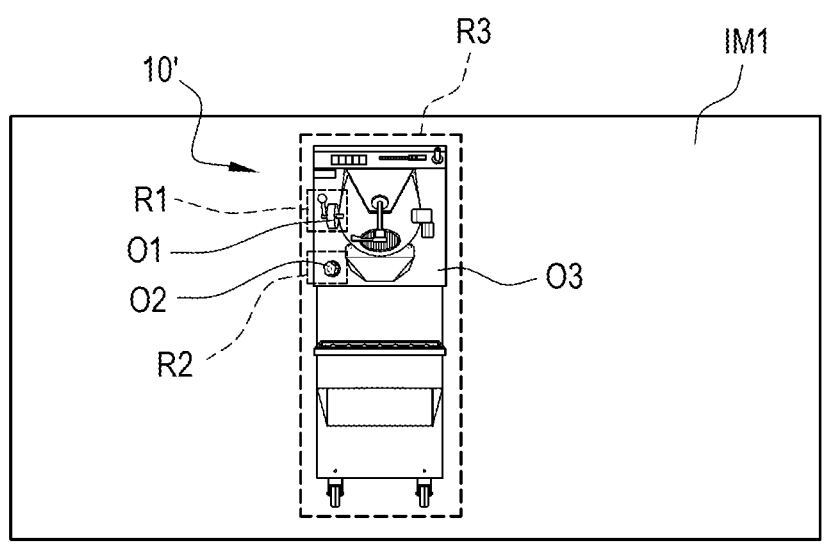

FIGS. 3 to 6 exemplify some aspects of this invention relating to the visor device 20 and the processing and control unit 106. In particular, FIG. 3 shows a non-limiting example of the first image IM1 captured by the visor device 20, FIGS. 4 and 5 show non-limiting examples of the second image IM2 generated by the control unit 106 of the machine 10 and FIG. 6 shows a non-limiting example of what the user wearing the augmented reality visor device 20 sees, in use, on the display 202.

With reference to FIGS. 2 and 3, a user wearing the visor device 20 and looking at the machine 10 may allow the camera 200 to capture the image 10' of the machine 10 or a portion of it. The first image IM1 may be processed by the processing and control unit 106 of the machine 10 and a plurality of real elements O1, O2, O3 may be identified in the first image IM1. Each real element Oi of the plurality of real elements O1, O2, O3 may delimit a corresponding first region Ri in the first image IM1.

In one or more embodiments, the first image IM1 is composed of a first pixel matrix and the first regions R1-R3 each comprise a plurality of pixels of the first pixel matrix.

In one or more embodiments, the second image IM2 is composed of a second pixel matrix, the pixels of the second pixel matrix having a predetermined match (for example, one-to-one) with the pixels of the first pixel matrix. That way, second regions I1, I2, I3 can be associated with the first regions R1-R3 in the first pixel matrix and each first region R1-R3 of the first pixel matrix may match a respective second region I1-I3 of the second pixel matrix.

According to an aspect of this invention, the one or more augmented reality graphic elements G1-G4 may therefore be located in the second image IM2, at least partly in the second regions I1-I3; for example, the augmented reality graphic elements G1 and G3 may comprise augmented reality connecting graphic elements (for example, lines or arrows) which link the second regions I1 and I2 to the augmented reality graphic elements G2 and G4.

In other words, the augmented reality graphic elements G1-G4, when projected on the display, may be overlaid on the image of the real objects O1-O3 and of the machine 10 as seen by the operator's eyes through the visor device 20 at the optimum position.

In one or more embodiments, once the real elements O1, O2, O3 have been identified, one or more augmented reality graphic elements G1, G2, G3, G4 can be associated with them. In the non-limiting example illustrated in FIGS. 3-5, the augmented reality graphic elements G1, G2 are associated with the real element O1, delimited by the region R1, the augmented reality graphic elements G3, G4 are associated with the real element O2, delimited by the region R2, and no graphic element is associated with the real element O3.

The augmented reality graphic elements G1-G4 may be configured to enhance the user's sensory experience and to facilitate the actions that the user has to perform on the machine 10: for example, its installation, maintenance and/or use.

According to an aspect of the invention, the machine 10 for treating food products may comprise at least one sensor 124, as illustrated in FIG. 1, configured to detect an operational and/or state parameter of the machine 10: for example, a temperature and/or a pressure inside the treatment chamber 100 and/or a quantity of food product fed into, present inside or derived from, the treatment chamber 100.

The processing and control unit 106, which is operatively connected to the at least one sensor 124, may thus be configured for:

receiving the operational and/or state parameter;

generating a graphic element G5 that may comprise at least one text element indicating the parameter detected; and incorporating into the second image IM2 the graphic element G5 generated.

As illustrated in FIG. 4, the graphic element G5 may be incorporated into a peripheral portion of the second image IM2.

As illustrated in FIG. 4, the graphic element G5 may comprise an indication of the value detected by the sensor 124.

In addition, or alternatively, as illustrated in FIG. 5, the processing and control unit 106 may be configured for:

checking whether the operational and/or state parameter detected by the at least one sensor 124 falls within a predetermined interval, indicating the correct operation of the machine;

if the operational and/or state parameter is outside the predetermined interval, generating a graphic element G5 defining an alarm message; and incorporating into the second image IM2 the graphic element G5 generated.

In one or more embodiments, the processing and control unit 106 may be configured to transmit the second image IM2 to the visor device 20 through the data exchange modules 108, 204. As illustrated in FIG. 6, the visor device 20 may be configured to display the second image IM2.

According to an aspect of the invention, the display 202 of the visor device 20 may comprise a lens that is permeable to light—for example, transparent—and may be configured to display the second image IM2 overlaid on the user's field of view. For example, the image may be projected on the lens by a projector. In other words, the display 202 may be considered as a goggle lens and the user is able to see the augmented reality graphic elements G1-G5 simultaneously and overlaid on the real objects—for example, the machine 10.

Also defined is a support method for the management (for example, installation, maintenance, use) of a machine 10 for treating food products. The method comprises:

providing a system 1 comprising an augmented reality visor device 20 and a machine 10 for treating food products as described above;

capturing at least one first image IM1 with the camera 200 of the visor device 20;

identifying one or more real elements O1-O3 within the at least one first image IM1;

incorporating one or more augmented reality graphic elements G1-G5 into the at least one second image IM2, as illustrated for example in FIG. 4; and displaying at least one second image IM2 with the at least one display 202 of the visor device 20.

Figure 8:
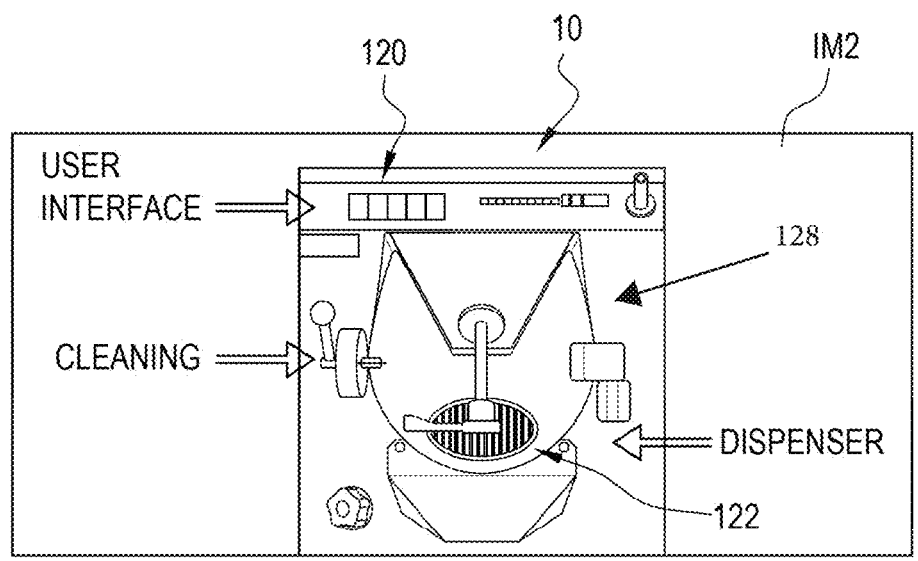

According to an aspect of the invention, the one or more real elements O1-O4 identified in the image IM1 may indicate a position of one or more components of the machine in the at least one first image, such as, for example, the dispenser 122, the user interface 120 or a door giving access to the mechanism of the machine 10 (see FIG. 8). The method may comprise associating one or more augmented reality graphic elements G1-G4 with the one or more real elements O1-O3 identified, as illustrated for example in FIG. 4.

According to an aspect of the invention, the method provided by this disclosure allows stepping the user through a sequence of steps for making a food product. By way of non-limiting example, a machine for treating food products may be an oven and the method may provide a user with support for the preparation of a sweet bakery product. For example, the method may facilitate the steps of: choosing the base products, calculating the quantities of the base products, mixing the base products and treating the mixture in the machine.

In one or more embodiments, the method may comprise the following steps:

providing at least one sensor 124—for example, a temperature and/or a pressure sensor and/or a sensor that detects the quantity of product present in, fed into or derived from the treatment in, the treatment chamber 100;

detecting, with the at least one sensor 124, an operational and/or state parameter of the machine 10 for treating food products—for example, a temperature, a pressure and/or a quantity of product;

generating a graphic element G5 comprising at least one text element indicating the parameter detected; and incorporating into the second image IM2 the graphic element G5 generated, as illustrated, for example, in FIGS. 4 and 5.

According to an aspect of the invention, the method can comprise the following steps:

checking whether the operational and/or state parameter detected by the at least one sensor 124 falls within a predetermined interval, indicating the correct operation of the machine 10;

if the operational and/or state parameter is outside the predetermined interval—for example, a temperature that reaches a potentially critical value and/or a quantity that falls below a certain value—generating a graphic element G5 comprising an alarm message, as illustrated, for example, in FIG. 5; and incorporating into the at least one second image IM2 the graphic element G5 generated.

This invention may have numerous applications: for example, it may be used to facilitate interaction between a user and the machine, performing the function of user manual (as better clarified below).

Figure 7:
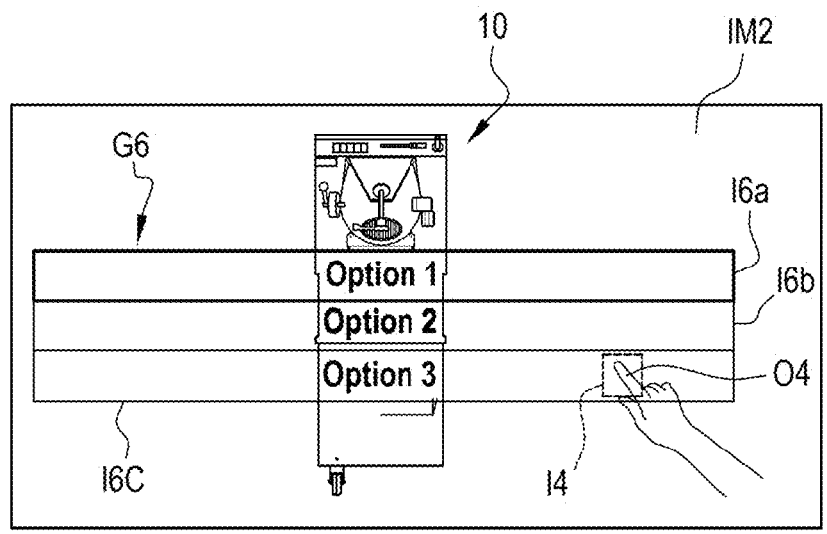

According to an aspect of the invention, as illustrated in FIG. 7, the method may comprise:

providing a memory 126 used to store a plurality of augmented reality elements G1-G5 relating to the operation and/or installation and/or maintenance of the machine 10 for treating food products;

displaying a menu G6 on the display 202 of the visor device 20;

when an option is chosen from the menu G6, retrieving from the memory 126 a set of augmented reality elements G1-G5 associated with that option; and displaying one or more of the augmented reality elements G1-G5 of the set.

According to an aspect of the invention, the choice of the option from the menu G6 may be made by the processing and control unit 106 recognizing an input from the user. In one or more embodiments, the input may derive from an input device such as augmented reality gloves or wristbands or a smartphone used as a pointing device, which may be coupled to the visor device 20 and to the processing and control unit 106. In addition, or alternatively, as illustrated in the non-limiting example of FIG. 8, the input may derive from recognizing a portion of at least one upper limb (e.g. one or more fingers, a hand, etc.) O4/R4 of a user in a manner not unlike what is done to recognize the plurality of real elements O1-O4. Based on the position R4 of the portion of at least one upper limb O4 on the first image IM1, it is possible to understand which option is chosen from the menu G6 because the option chosen will be positioned (see second regions 16a, 16b, 16c in FIG. 8) in the second image IM2 in a second region 14 associated with the position R4 of the portion of at least one upper limb O4. In the non-limiting example of FIG. 8, the option chosen is the one in the second region 16c in that it is partly overlaid on the region 14.

According to an aspect of the invention, the method can comprise the following steps:

displaying a menu G6 comprising an option for displaying the correct operation of the machine 10 and/or an option for the maintenance of the machine 10;

when an option is chosen, retrieving from the memory 126 a set of augmented reality elements G1-G5 associated with that option; and incorporating into the at least one second image IM2 one or more augmented reality elements G1-G5 of the set of augmented reality graphic elements retrieved.

In addition, or alternatively, as illustrated in FIG. 8, the options may be presented in a form other than a menu. In effect, for each real element Oi recognized by the machine 10, such as the interface 120, the dispenser 122 or a door 128 in the non-limiting example of FIG. 8, it is possible to access dedicated contents.

With specific reference to FIG. 8, the processing and control unit 106 may thus be configured for:

identifying a plurality of real objects, such as, for example, the interface 120, the dispenser 122 and the door 128;

generating a plurality of text elements indicating the real objects recognized and a plurality of augmented reality graphic connecting elements (e.g. lines or arrows) which connect the text elements to the real elements; and incorporating the text elements and the plurality of augmented reality graphic connecting elements (e.g. lines or arrows) into the second image IM2.

In one or more embodiments, the support system for the management of the machine 10 can allow:

installation, maintenance, management and/or fault diagnosis by an engineer;

installation support—for example, it may comprise the initial steps that an engineer is required to carry out with hardware and software to start the machine up for the first time;

support for an end user of the machine—for example, by facilitating the customer's interaction with the machine for making the recipes or for cleaning (for example, the visor device 20 may step the customer through a procedure and may comprise an instruction manual).

In the latter case—that is, in the case where the processing and control unit 106 provides support for the end user of the machine, the user is stepped through the recipes: this advantageously prevents errors and allows implementing a step-by-step procedure which guides the user in using the machine through to the preparation of the finished product.

According to an aspect of this invention, the recipes may contain product quantities, a detailed description of the time-temperature cycle and the machine settings.

In one or more embodiments, the augmented reality elements (preferably graphic) G1-G5 may allow setting the times and/or the temperatures and/or displaying the settings in use on the machine.

For example, the menu G6 may comprise one or more recipes. In the case where the machine 10 comprises a machine for treating liquid or semi-liquid products in the baking and confectionery and ice cream trade, the menu G6 may comprise options for stepping the user through the production of ice cream, chocolate, granitas, etc. The moment the operator chooses an option, the machine 10 can show on the display 202 of the visor device 20 one or more indications, in the form of augmented reality elements (preferably but not necessarily graphic) G1-G5 which may comprise, for example, the actions that the user must perform and the quantity of product to be added.

For example, the information can be updated in real time and can be adapted to the actions performed by the user.

In the same way, the menu G6 may comprise options to facilitate the user in the cleaning of the machine 10. Once the part of the machine 10 to be cleaned has been selected, the machine 10, through the visor 20, can show the following:

alert messages in case some of the components of the machine 10—for example, the stirrer 19—risk being damaged during cleaning;

an exploded drawing of the components to be cleaned to help the user disassemble and reassemble the components;

indications as to the tools needed to perform the operations described—for example, which screwdriver is best suited to which screw according to the machine component to be cleaned.

In this case, too, the information can be updated in real time and can be adapted to the actions performed by the user.

Advantageously, in the event of any problem, it is possible to connect up to the remote support service in real time to be stepped through the solution to problems by interacting with the machine.

Advantageously, the proposed system and method allow reducing the time connected with the installation, maintenance and/or running of the production machines.

Further, the proposed system and method allow reducing the likelihood of human error connected with the installation, maintenance and/or running of the production machines since personnel, through the visor device, can be assisted and stepped through the performance of the above mentioned activities.

Lastly, the proposed system and method allow performing maintenance and fault diagnosis more quickly and efficiently, for example by reducing staff training costs and times.

Furthermore, with the proposed system and method, the staff employed require less training since the visor device assists operators in performing their duties, in practice substituting the specific training and know-how relating to the specific machine.

Moreover, advantageously, the proposed system and method provide effective support for the implementation of recipes for the production of the end product, which facilitates end users in the production of the finished product according to procedures defined by international experts (cooks, chefs and experts of international fame).

What is claimed is:

1. A support system for management of a machine for treating food products, the system comprising:
   an augmented reality visor device comprising:
      at least one camera configured to capture at least one first image;
      a first data exchange module configured to transmit the at least one first image and to receive augmented reality elements;
   a machine for treating food products, comprising:
      a treatment chamber configured to receive a food product,
      an actuator configured to apply a treatment process on the food product inside the treatment chamber, and
      a second data exchange module connectable to the first data exchange module;
   a controller connected to the second data exchange module, wherein the controller is configured to:
      receive the at least one first image from the visor device through the second data exchange module,
      identify one or more real elements within the at least one first image,
      generate one or more augmented reality elements based on information contained in, or extracted from, the at least one first image,
         wherein the information includes geometrical, dimensional and/or color data of components of the machine and/or objects which the controller is configured to identify;
         wherein the one or more augmented reality elements comprise text elements, geometric elements, graphic link elements and/or a virtual reconstruction, static and/or animated, of the real object and relating to at least one chosen from operation, installation and maintenance of the machine;
      generate at least one second image,
      incorporate the one or more augmented reality elements into the at least one second image, and
      transmit the at least one second image to the visor device through the second data exchange module;
   a memory connected to the controller, the memory having stored therein:
      the one or more augmented reality elements; and
      the information;
   wherein the controller is configured to identify the one or more real elements in the at least one first image by comparing the at least one first image with the information stored in the memory.

2. The system according to claim 1, wherein the visor device comprises at least one display configured to display the at least one second image.

3. The system according to claim 1, wherein the augmented reality elements include sounds and/or graphic elements.

4. The system according to claim 1, wherein the one or more real elements within the at least one first image indicate parts or components of the machine.

5. The system according to claim 1, wherein the controller is configured to associate the one or more augmented reality elements with the one or more real elements.

6. The system according to claim 1, wherein:
the at least one first image is composed of a first pixel matrix,
the at least one second image is composed of a second pixel matrix, with pixels of the second pixel matrix having a predetermined match with pixels of the first pixel matrix,
the one or more real elements are located in a first region of the first pixel matrix,
the first region of the first pixel matrix corresponds to a second region of the second pixel matrix.

7. The system according to claim 1, wherein the machine for treating food products is a machine for treating liquid or semi-liquid food products, wherein the treatment chamber comprises a processing container for processing a liquid or semi-liquid base product and wherein the actuator comprises a stirrer for mixing the base product in the processing container, the machine for treating food products further comprising a thermal treatment system having a heat exchanger thermally connected with the processing container.

8. The system according to claim 1, wherein the machine for treating food products comprises at least one sensor, connected to the controller and configured to detect an operational and/or state parameter of the machine, and wherein the controller is configured to:
receive the operational and/or state parameter;
generate an augmented reality element indicating the parameter detected.

9. The system according to claim 8, wherein the controller is configured to incorporate in the at least one second image the augmented reality element indicating the parameter detected.

10. The system according to claim 1, wherein the controller is configured to drive the actuator.

11. The system according to claim 1, wherein the machine is an oven and wherein the actuator comprises one or more heating elements for thermally treating the food products.

12. A support method for management of a machine for treating food products, the method comprising:
providing a system comprising:
an augmented reality visor device comprising:
at least one camera configured to capture at least one first image;
a first data exchange module configured to transmit the at least one first image and to receive augmented reality elements;
a machine for treating food products, comprising:
a treatment chamber configured to receive a food product,
an actuator configured to apply a treatment process on the food product inside the treatment chamber, and
a second data exchange module connectable to the first data exchange module;
a controller connected to the second data exchange module, wherein the controller is configured to:
receive the at least one first image from the visor device through the second data exchange module,
identify one or more real elements within the at least one first image,
generate one or more augmented reality elements based on information contained in, or extracted from, the at least one first image,
wherein the information includes geometrical, dimensional and/or color data of components of the machine and/or objects which the controller is configured to identify;
wherein the one or more augmented reality elements comprise text elements, geometric elements graphic link elements and/or a virtual reconstruction, static and/or animated, of the real object and relating to at least one chosen from operation, installation and maintenance of the machine;
generate at least one second image,
incorporate the one or more augmented reality elements into the at least one second image, and
transmit the at least one second image to the visor device through the second data exchange module;
a memory connected to the controller, the memory having stored therein:
the one or more augmented reality elements; and the information;
wherein the controller is configured to Identify the one or more real elements in the at least one first image by comparing the at least one first image with the information stored in the memory;
capturing the at least one first image with the at least one camera;
identifying the one or more real elements within the at least one first image;
generating the one or more augmented reality elements based on the information.

13. The method according to claim 12, further comprising the following steps:
incorporating the one or more augmented reality elements in the at least one second image, and
displaying the at least one second image with the at least one display of the visor device.

14. The method according to claim 12, wherein the one or more real elements indicate a position of one or more objects in the at least one first image.

15. The method according to claim 12, comprising a step of associating the one or more augmented reality elements with the one or more real elements.

16. The method according to claim 12, comprising:
displaying on the display of the visor device a menu comprising an option for displaying a correct operation of the machine and/or an option for the maintenance of the machine;
when one of the options is chosen from the menu, retrieving from the memory a set of the augmented reality elements associated with the one of the options; and
displaying one or more of the augmented reality elements of the set.

17. The method according to claim 12, comprising the following steps:
providing at least one sensor;
detecting, with the at least one sensor, an operational and/or state parameter of the machine;

generating one of the one or more augmented reality elements based on the parameter detected.

18. The method according to claim 17, further comprising incorporating into the at least one second image the one of the one or more augmented reality elements.

19. The method according to claim 17, comprising the following steps:
- checking whether the operational and/or state parameter detected by the at least one sensor falls within a predetermined interval, indicating a correct operation of the machine;
- if the operational and/or state parameter is outside the predetermined interval, generating one of the one or more augmented reality elements that defines an alarm message.

20. The method according to claim 19, further comprising of incorporating into the at least one second image the one of the one or more augmented reality elements.

21. The method according to claim 12, wherein the step of generating the one or more augmented reality elements based on the information comprises generating a sequence of one or more augmented reality elements defining an assisted procedure for making a recipe for preparing a food product with the machine.

22. The method according to claim 21, wherein the sequence of one or more augmented reality elements relate to choosing base products, to calculating quantities of the base products, to instructions for mixing the base products to create a mixture and to treating the mixture.

* * * * *